C. W. GRETER.
Vehicle Coupling.
No. 81,363.
Patented Aug. 25, 1868.
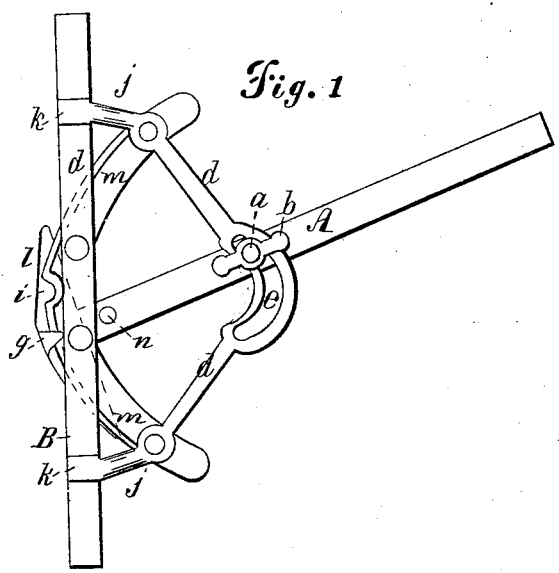
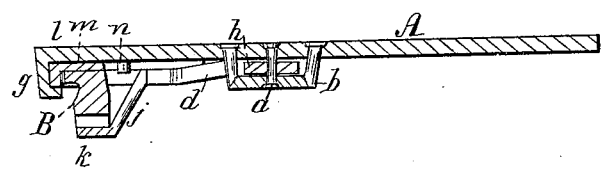
Witnesses:
Wm A. Morgan.
G. C. Cotton.
Inventor:
C. W. Greter.
per Munn & Co.
Attys.

United States Patent Office.

CHARLES W. GRETER, OF THREE RIVERS, MICHIGAN.

Letters Patent No. 81,363, dated August 25, 1868.

IMPROVEMENT IN COUPLING FOR VEHICLES.

The Schedule referred to in these Letters Patent and making part of the same.

TO ALL WHOM IT MAY CONCERN:

Be it known that I, CHARLES W. GRETER, of Three Rivers, in the county of St. Joseph, and State of Michigan, have invented a new and improved Coupling for Vehicles; and I do hereby declare that the following is a full, clear, and exact description thereof, which will enable those skilled in the art to make and use the same, reference being had to the accompanying drawings, forming part of this specification, in which—

Figure 1 is a top view of my invention.

Figure 2 is a central vertical section of the same.

Similar letters of reference indicate corresponding parts.

The object of this invention is to accomplish the abrupt or sharp turning of the front wheels of vehicles, without jointing the coupling or reach-pole of the same.

In the drawings, A is the reach-pole connecting the front and rear axles of a four-wheeled vehicle.

B is the front axle, to which is affixed, by bolts or other means, an arched or curved plate, $m$, united to the axle B by braces $j\,j$ and clips $k\,k$, as shown.

The braces $j\,j$ are prolonged behind the plate $m$ to form the arms $d\,d$, which unite with each other at a plate having a curved or arched slot, E, which latter encloses a pin, $a$, projecting downward from the reach-pole A, and being a part of the guide-plate $b$, also affixed to the reach-pole.

The plate $m$ is formed with a notch, $i$, in the middle point of its front edge, and into this notch the beak or nib $g$ fits when the front axle is parallel with the rear axle.

The pin $a$ will then be in the middle of the slot E, at which point the nib $g$ is held within the notch $i$.

When, however, the front axle is turned to the right or left, the pin $a$ is moved toward the opposite end of its slot, which latter being curved reversely to the plate $m$, permits the axle to be turned abruptly on the pin $a$ as a centre of vibration.

The pin $a$ is provided with a roller to permit the more easy movement of the parts in contact with it.

The cross-plate $l$ forms part of the reach-plate A, and is for the purpose of affixing the front part of the body of the vehicle to the reach-pole.

I claim as new, and desire to secure by Letters Patent—

1. A coupling-device for vehicles, constructed and arranged substantially as described and for the purposes set forth.

2. The curved plate $m$ with notch $i$, braces $j\,j$ with curved slot E thereon, and cross-plate $l$ with nib $g$, substantially as described, when constituting the prominent features of a vehicle-coupling, all as set forth.

CHARLES W. GRETER.

Witnesses:
ENOCH KLINE,
E. H. LOTHROP.